Feb. 25, 1964     H. P. RAABE     3,122,738
RADAR AREA DISPLAY WITH RESOLUTION OF INDIVIDUAL PULSES
Filed July 17, 1956     2 Sheets-Sheet 1
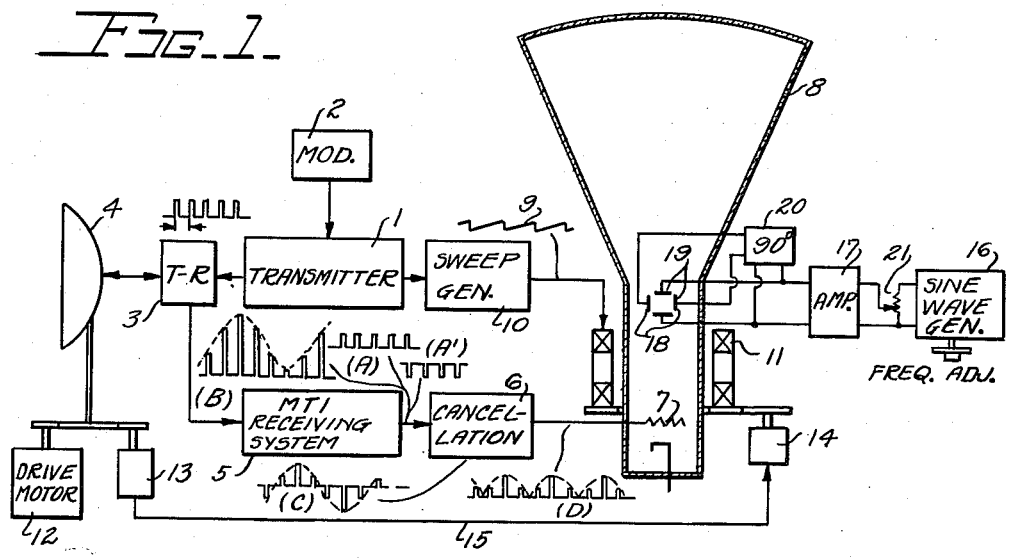
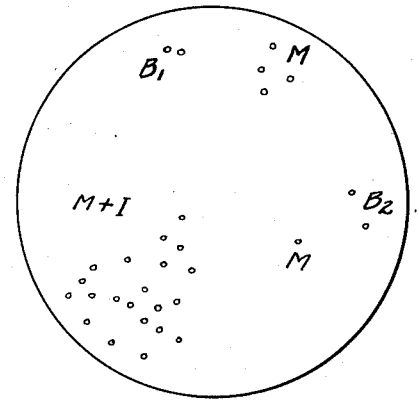
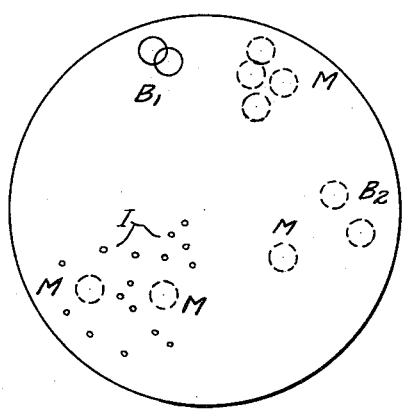
INVENTOR.
HERBERT P. RAABE
BY
ATTORNEY
AGENT Feb. 25, 1964     H. P. RAABE     3,122,738
RADAR AREA DISPLAY WITH RESOLUTION OF INDIVIDUAL PULSES
Filed July 17, 1956     2 Sheets-Sheet 2

INVENTOR.
HERBERT P. RAABE
BY Wade Koonty
ATTORNEY
James S. Shannon
AGENT

United States Patent Office 3,122,738
Patented Feb. 25, 1964

3,122,738
RADAR AREA DISPLAY WITH RESOLUTION
OF INDIVIDUAL PULSES
Herbert P. Raabe, Dayton, Ohio, assignor to the United States of America as represented by the Secretary of the Air Force
Filed July 17, 1956, Ser. No. 598,483
5 Claims. (Cl. 343—7.7)
(Granted under Title 35, U.S. Code (1952), sec. 266)

The invention described herein may be manufactured and used by or for the United States Government for governmental purposes without payment to me of any royalty thereon.

This invention relates to a new method of radar area display in which a small circular deflection is added to the normal sweep pattern of the electron beam. It can be applied to any type of area display, the rectangular or B-scope type as well as the polar or PPI type. In certain cases this novel presentation is able to furnish additional information which otherwise would be lost.

A typical example when superimposed circular deflection can be used to advantage is in MTI (moving target indication) radar systems. Such application of the invention will be discussed more fully in connection with the specific embodiment thereof shown in the accompanying drawings, in which FIG. 1 is a schematic diagram of the invention applied to an MTI radar system using a PPI display;

FIGS. 2A and 2B illustrate MTI presentations with and without superimposed circular sweep;

Figure 3:
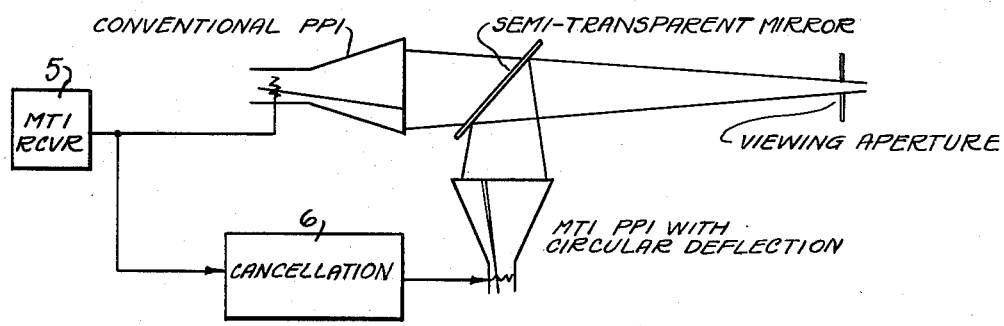
FIG. 3 shows a method of optically combining MTI and regular terrain presentations.

MTI radar systems are adequately described in the literature, for example, volume 1 of the Radiation Laboratory Series, McGraw-Hill, pages 626–679, and no more than a general representation of such a system is shown in FIG. 1. In this figure transmitter 1 is pulse modulated by modulator 2 and the resulting pulses of high frequency energy are applied through transmit-receive network 3 to directional antenna 4 for radiation in a narrow beam. The returning echoes from the radiated pulses are received by the antenna and transmitted through T-R network 3 to the MTI receiving system 5. Echoes from all reflectors or targets illuminated by the radiated beam are received, however, those received from targets having a radial velocity relative to the antenna, or a radial ground velocity in the case of airborne MTI radar, are distinguished from the echoes received from targets having no radial velocity by a Doppler change in frequency determined by the radial velocity. In the video output of the receiver successive returns from a target having no radial velocity have constant amplitude and appear as at A and A' in FIG. 1. Successive returns from a target having radial velocity appear as at (B), the amplitude envelope of the pulses being a sine wave of Doppler frequency. Cancellation circuit 6 operates to subtract each pulse from the preceding pulse through a process of delaying the video signal by one pulse repetition interval T and subtracting the delayed signal from the undelayed video signal. Since successive returns from stationary targets do not change in amplitude, this process results in substantially complete cancellation of these returns. In the case of returns from a moving target, however, there is a change in amplitude from pulse to pulse so that there is a net output having the wave form (C) remains after subtraction. Because of the bipolar nature of signal (C) the cancellation circuit 6 also contains a full wave rectifier which results in the output of this circuit having the wave form (D) in which the amplitude envelope has twice the Doppler frequency. Signal (D) is applied to the beam intensity control electrode 7 of cathode-ray tube 8. Cancellation circuits are described in the above reference, particularly on page 634.

Cathode-ray tube 8 is part of a PPI or polar radar display. In this type display the electron beam of the tube is deflected radially from the center to the edge of the fluorescent screen once for each transmitted pulse. A saw-tooth deflection current 9, produced by sweep generator 10 and synchronized with the transmitted pulses, is applied to deflection yoke 11 for effecting the required radial deflection. At the same time yoke 11 rotates at constant speed in synchronism with antenna 4 so that the direction of the scan corresponds to the direction of the antenna. The antenna drive is provided by constant speed motor 12 and an electromechanical coupling, comprising electromechanical elements 13—14 and interconnecting circuits 15, provides the synchronous drive of the yoke. In the PPI display, the distance of the target from the center of the cathode-ray tube screen is proportional to the range of the target from the antenna and its angular position on the screen corresponds to the target azimuth.

The MTI signal applied to grid 7 consists of a number of video pulses. The number of pulses, $n$, can be obtained from the antenna beam width, $d$, the scan rate in degrees per second, $e$, and the pulse repetition frequency in pulses per second, $f_p$, by the relation:

$$n = d \frac{f_p}{e}$$

A typical MTI radar may have the following characteristics:

Radio frequency, $f_r$ _____ 9375 mc./s.
Pulse repetition rate, $f_p$ _____ 2000/s.
Beam width, $d$ _____ 1.5°.
Scan rate, slow, $e_s$ _____ 36°/s.
Scan rate, fast, $e_f$ _____ 132°/s.

For this radar set, the number of pulses per target signal becomes $n_f=23$ for the fast scan and $n_s=83$ for the slow scan.

The life time, $t_n$, of the signal is the time during which the number of pulses, $n$, is received. Therefore, $$t_n = \frac{n}{f_p} = \frac{d}{e}$$

For the example given, the life times for the fast scan rate and the slow scan rate, respectively, become 11.4 and 41.7 milliseconds. If the target is displayed in the conventional way, the $n$ pulses are concentrated in such a small area compared with the resolution of the cathode-ray tube that they appear as a single spot. Consequently, the amplitude modulation of the moving target signal, illustrated at (C) in FIG. 1, and the signal life time are disregarded by the conventional indicator.

Theoretically, in conventional MTI systems such as described so far, the returns from fixed targets are cancelled and do not appear on the indicator screen. As a practical matter cancellation is not perfect, particularly for strong returns, and some fixed target indications do occur. Further, signals which are not received at exactly the same repetition rate as the echo signals of the radar are not filtered out by the cancellation circuit and also appear on the screen of the indicator. Therefore a state of confusion exists between indications of true moving targets and indications of extraneous signals and, although the moving target signal applied to the indicator has an amplitude modulation that could serve to distinguish it from the other signals, this information is not displayed by the conventional indicator.

In accordance with the invention it is proposed to apply an additional sweep to the beam of the indicator tube for the purpose of providing a time base equal to the life time of the signal. The logical form of this sweep is circular. If a superimposed circular deflection is applied to the beam at such a frequency that one cycle of the deflection is completed within the life time of the signal, all targets appear as circles. With the radar parameters given above, the circular deflection frequencies for both fast and slow scan rates become $$f_{cf} = \frac{1}{11.4 \times 10^{-3}} = 88 \text{ c./s.}$$

and $$f_{cs} = \frac{1}{41.7 \times 10^{-3}} = 24 \text{ c./s.}$$

Given a sufficiently large circle diameter, it is possible to resolve the individual pulse return on the circular trace and thus display any modulation of the pulses. In particular, moving targets would appear as circles with a sinusoidal intensity variation of the trace.

The number of intensity cycles, N, can be used to determine the radial velocity of the target within certain restrictions due to ambiguities. These ambiguities are caused by the unknown sign of the radial velocity and by the limited rate of information contained in the modulation of a pulse carrier. This means that Doppler frequency shifts above the limiting frequency will be transformed into frequencies within the limited range of one-half of the pulse repetition frequency. The following equation determines the number of intensity cycles on the circle:

$$N = \frac{2d}{e} \frac{2f_r V_r}{c} - kf_p$$

where $k = 0, 1, 2, \ldots$ $$\frac{2f_r V_r}{c} - kf_p \frac{f_p}{2}$$

In this equation, $f_r$ is the radio frequency, $v_r$ is the radial velocity of the target and $c$ is the velocity of light. The equation also states that $k$ must be zero or a positive integer, so that the frequency term in the parentheses remains within the limited range. For the radar with the previously listed parameters, the radial velocity per intensity cycle in the range $k=0$ becomes $v_{rs} = 0.37$ knots during the slow scan, and $v_{rf} = 1.37$ knots during rapid scan.

When a moving target is being watched having superimposed circular deflection, and the beam is fixed on the target, an interesting stroboscopic effect can be observed. If the radial velocity of the target happens to be of such value that the number of intensity cycles, N, becomes an integer, the modulation pattern appears to be fixed on the circle. However, slight departure of the radial velocity from this value causes the modulation pattern to spin. This is a very striking effect which aids considerably in tracking a moving target through interference or uncancelled reflections from fixed objects.

It must be realized that superimposed circular deflection reduces the brightness of the signal by spreading the intensity of the electron beam over a larger area. This apparent disadvantage is compensated for, to a certain extent, by the new factor of shape. When the operator is aware that a target is presented in a circular shape of a certain size he performs an integration in his mind which appears to be as powerful as the integration due to the build-up of brightness at one spot during the life time of a signal.

Great advantage can be realized from the use of superimposed circular deflection in the identification of targets. Interference and jamming pulses are not received at exactly the same repetition rate as the echo signals of the radar. Consequently, these pulses are scattered throughout all ranges and cannot form circles on the screen. Jamming is very effective with MTI radar because the delay-subtraction process of the cancellation circuit permits the full amplitude of a jamming pulse to pass, while passing only a differential amount of the moving target echo pulse. Furthermore, since in most cases moving targets are point targets, there is practically no difference in appearance between a jamming pulse and a moving target signal on a conventional PPI indicator.

Very strong returns from a fixed target are not completely cancelled by an MTI radar. Since there is no amplitude modulation of these pulses and since there are a comparatively large number of pulses in one life time, these returns appear on an indicator with circular sweep as circles of constant intensity. With airborne radar, the cancellation of ground patches is reduced at angles off the ground track due to beamwidth fluctuation. In this case a pulse amplitude modulation effect can be expected. Although this modulation is similar to that occurring in returns from moving targets it is of considerably slower frequency and therefore can be distinguished from a true moving target return on the circular sweep. The maximum fluctuation frequency, $f_t$, due to beamwidth, $d$, and velocity, $v$, of the aircraft received from ground patches at an angle, $\theta$, off the ground track is $$f_t = 2 \frac{v f_r d}{c} \sin \theta$$

A Doppler frequency of the same magnitude would be caused by a moving target whose radial velocity was $$v_c = v_d \sin \theta$$

Therefore, if the Doppler modulation of the circle on the indicator indicates velocities higher than $v_c$, it can be definitely concluded that the target is moving.

The foregoing is illustrated in FIGS. 2A and 2B. FIG. 2A shows the indicator screen of a conventional MTI radar on which $B_1$ represents uncancelled returns from fixed targets near the ground track of an airborne radar; $B_2$ represents similar uncancelled returns from fixed targets at an angle to the ground track; M represents moving targets; and I represents interference. FIG. 2B illustrates the appearance of the indicator screen when a circular sweep in accordance with the invention is employed. Only the moving targets and uncancelled returns from fixed targets appear as circles. The latter are distinguishable from the moving targets M by the smaller number of intensity variations in the sweep ($B_2$) or by the circle being of constant intensity as in the case of uncancelled returns from fixed targets near the ground track ($B_1$). All circles of light are continuous since the velocity of the additional sweep, i.e. the diameter of the circle in the case of a circular sweep, is such that the displays of successive pulses are contiguous. This is possible because of the finite size of the electron beam and the fact that the spot of light produced by the beam is slightly larger than the beam itself. Accordingly, in FIG. 2B, the dashed circles represent variations in light intensity along the circular sweep and the solid circles represent constant light intensity along the circular sweep.

The apparatus for providing the circular sweep is simple and is shown in FIG. 1. The output of an adjustable frequency sine wave generator 16 is applied, through amplifier 17 if necessary, to horizontal deflection electrodes 18 and vertical deflection electrodes 19. A phase difference of 90° between the energizations of the vertical and horizontal electrodes is established by phase shifter 20 for the purpose of creating a revolving electrostatic field which imparts the desired circular sweep to the beam. The period of the sweep is controlled by adjusting the frequency of the generator 16, while the diameter of the circular sweep is controlled by amplitude regulating device 21. By adjusting the frequency of generator 16 the period of the sweep may be made equal to the duration of the video signal. The level control 21, by controlling the sweep diameter, in effect controls the sweep velocity and therefore the extent to which the video signal is spread across the face of the tube. To obtain any improvement in resolution this velocity must exceed the normal sweep velocity of the beam.

Figure 4:
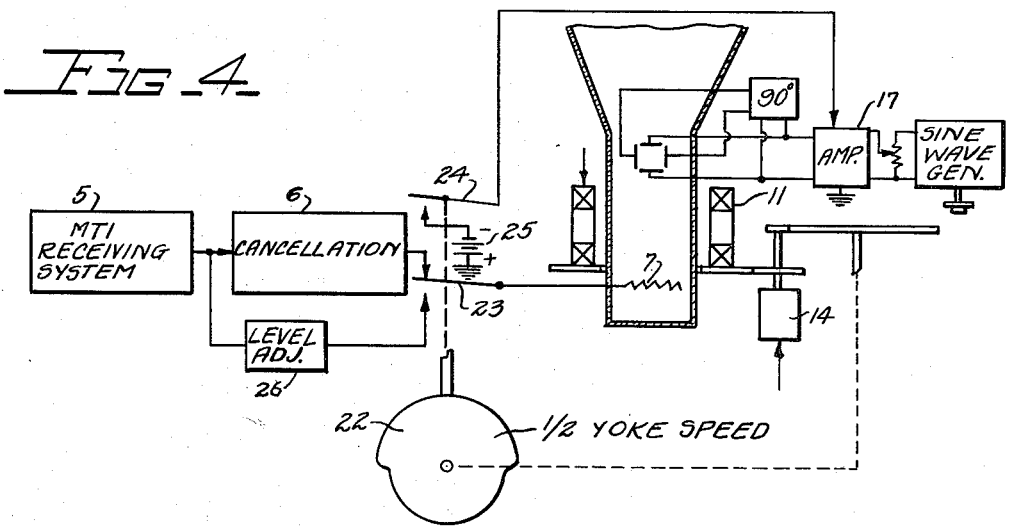
FIG. 4 shows a modification of FIG. 1 for electronically combining MTI and regular terrain presentations.

While the superimposed circular sweep is most useful in MTI radar, it also has usefulness in non-MTI radar systems when operated under conditions of low ground clutter such as over a calm sea. In this case targets, either fixed or moving, are effectively distinguished from interference and jamming by their circular indications. Also superimposed circular deflection offers a solution to the problem of simultaneous presentation of terrain features and moving targets. With the terrain presented in normal fashion, it is possible to show the moving targets as circles added to the terrain. This effect can be achieved by optical superposition, for example, by the use of a semitransparent mirror as shown in FIG. 3, or by electronic means as shown in FIG. 4. In this figure, which is a modification of FIG. 1, cam 22 is driven at one-half the speed of yoke 11 and actuates switches 23 and 24. When switches 23 and 24 are in their upper positions, as shown, the input to grid 7 of indicator tube 8 is derived from the output of cancellation circuit 6, and blocking voltage 25 is removed from amplifier 17 permitting circular deflection of the electron beam to take place. This condition holds for one complete 360° scan of the antenna during which the presentation is as shown in FIG. 2B. During the next scanning cycle of the antenna, switches 23 and 24 are in their lower positions so that the uncancelled video output of receiver 5 is applied through level adjuster 26 to the indicator tube and the superimposed circular sweep of the electron beam is removed by application of negative blocking voltage 25 to amplifier 17. Therefore, the uncancelled video due to the terrain and the cancelled video due to moving targets together with superimposed circular sweep appear on the indicator screen during alternate antenna scanning cycles, resulting in the circular moving target indications appearing on the radar map of the terrain. Level control 26 is for attenuating the total return by an amount commensurate with the attenuation of moving target signals by cancellation circuit 6.

As already indicated, the invention is applicable to other types of area displays as well as to the PPI type. An example is the B-type of display in which azimuth is represented along the horizontal axis and range along the vertical axis. The superimposed circular deflection is effected in the same way as for the PPI display shown in FIG. 1.

I claim:

1. In a moving target indicating pulsed radar system having means for producing video signals from the returns from both moving targets and fixed targets in a scanned field, each video signal consisting of a series of video pulses corresponding to the series of echo pulses received from a target during one scan by the radar system, the video signals representing moving targets having a Doppler frequency amplitude modulation, and in which said video signals are applied to a cancellation circuit for blocking the passage of fixed target signals, a cathode ray tube plan position indicator for simultaneously producing over an area representing said scanned field visual representations of said video signals both before and after cancellation, said visual indications being produced by the excitation of a phosphor with an electron beam, said plan position indicator comprising means for controlling the intensity of a phosphor exciting electron beam in accordance with the uncancelled video signals, said plan position indicator also comprising means for controlling a phosphor exciting electron beam in accordance with the cancelled video signals together with means for imposing a continuously repeating circular sweep on the beam having a duration substantially equal to the duration of a video signal and a circumference of sufficient length to provide contiguous displays of the video pulses constituting said moving target video signals.

2. A radar system comprising means including a directional antenna for radiating pulses of high frequency energy at a constant repetition rate, said antenna having a scanning motion, a radar receiver coupled to said antenna for receiving echoes of said radiated pulses and for converting said echoes into corresponding video pulses, a display device comprising a cathode ray tube having a fluorescent screen and a beam intensity control electrode, means for applying video pulses from said receiver to said beam intensity control electrode for display on said screen, means synchronized with said antenna for producing a sweep of the electron beam of said tube across said screen corresponding to the scanning motion of said antenna, the velocity of said sweep being too low to resolve the individual video pulses on said screen, and means for imparting a continuously repeating additional sweep to said beam, said additional sweep having a duration many times the repetition interval of said pulses and having the velocity required to provide contiguous displays of successive video pulses on said screen.

3. A moving target indicating radar system comprising: means including a directional antenna, having a scanning motion, for radiating pulses of high frequency energy at a constant repetition rate; a receiver coupled to said antenna for receiving echoes of said radiated pulses from reflecting objects and for converting said echoes into corresponding video pulses, the video pulses corresponding to echoes received from moving objects exhibiting a pulse-to-pulse amplitude variation; a display device comprising a cathode ray tube having a fluorescent screen and a beam intensity control electrode; a cancellation circuit; means for applying the video pulse output of said receiver to the input of said cancellation circuit and the video pulse output of said cancellation circuit to said beam intensity control electrode for display on said screen; means synchronized with said antenna for producing a sweep of the electron beam of said tube across said screen corresponding to the scanning motion of said antenna, the velocity of said sweep being too low to resolve the individual video pulses on said screen; and means for imparting a continuously repeating additional sweep to said beam, said additional sweep having a duration many times the repetition interval of said pulses and having the velocity required to provide contiguous displays of successive video pulses on said screen.

4. In a moving target indicating pulsed radar system having a directional antenna with a scanning motion and having means for producing video pulses corresponding to echo pulses received from both moving and fixed targets in a scanned field, the video pulses due to moving targets having a Doppler frequency amplitude modulation, and in which the video pulses are applied to a cancellation circuit for blocking the passage of fixed target signals: a pair of cathode ray display tubes; means for controlling the intensity of the electron beam in one of said tubes in accordance with the video pulses due to both fixed and moving targets; means for controlling the intensity of the electron beam in the other of said tubes in accordance with video pulses in the output of said cancellation circuit; means synchronized with said antenna for producing sweeps of the electron beams of said tubes corresponding to the scanning motion of said antenna, the velocity of said sweeps being too low to resolve the individual video pulses on said screens; means for imparting a continuously repeating additional sweep in the form of a circle to the electron beam in said other tube, said additional circular sweep having a duration many times the pulse repetition period of said radar system and having the circumferential velocity required to provide contiguous displays of successive video pulses; and optical means for superimposing the displays of said tubes.

5. In a moving target indicating pulsed radar system having a directional antenna with a cyclic scanning motion and having means for producing video pulses corresponding to echo pulses received from both moving and fixed targets in a scanned field, the video pulses due to moving targets having a Doppler frequency amplitude modulation, and in which the video pulses are applied to a cancellation circuit for blocking the passage of fixed target signals: a cathode ray display tube having a beam intensity control electrode; means synchronized with said antenna for producing a cyclic sweep of the electron beam of said tube corresponding to the cyclic scanning motion of said antenna; switching means synchronized with said sweep producing means and connected between said video pulse producing means and said control electrode and between the output of said cancellation circuit and said control electrode for applying said video pulses due to both moving and fixed targets and the video pulses remaining in the output of said cancellation circuit to said control electrode in alternate cycles of said sweep; means for imparting a continuously repeating additional sweep in the form of a circle to said beam, said additional sweep having a duration many times the pulse repetition period of said radar system and having the circumferential velocity required to provide contiguous displays of successive video pulses; and means synchronized with said switching means for disabling said additional sweep imparting means during the times when video pulses due to both fixed and moving targets are applied to said control electrode.

References Cited in the file of this patent

UNITED STATES PATENTS

| | | |
|---|---|---|
| 2,597,636 | Hall | May 20, 1952 |
| 2,606,318 | Haworth et al. | Aug. 5, 1952 |
| 2,617,982 | Holschuh | Nov. 11, 1952 |
| 2,866,191 | McFall | Dec. 23, 1958 |